United States Patent [19]
Zankl

[11] 4,448,563
[45] May 15, 1984

[54] PIVOTAL RIVET ASSEMBLY

[76] Inventor: Robert H. Zankl, 5410 Banyan Dr., Miami, Fla. 33156

[21] Appl. No.: 186,827

[22] Filed: Sep. 12, 1980

[51] Int. Cl.³ .................................................. F16C 11/00
[52] U.S. Cl. ...................................... 403/161; 24/573
[58] Field of Search .............. 411/500, 501, 502, 503, 411/504, 505, 517, 518, 519, 354; 24/201 A, 221 R; 403/154, 155, 152, 157, 158, 159, 161, 163

[56] References Cited

U.S. PATENT DOCUMENTS

| | | | |
|---|---|---|---|
| 99,508 | 2/1870 | Williams | 24/221 R X |
| 530,766 | 12/1894 | Gaston | 411/354 |
| 1,278,782 | 9/1918 | Stoner | 24/201 A X |
| 1,615,698 | 1/1927 | Hartzel | 24/201 A |
| 1,666,783 | 4/1928 | Kries | 24/201 A X |
| 2,120,530 | 6/1938 | Shippee et al. | 411/500 X |
| 2,217,249 | 10/1940 | Flower | 24/221 R |
| 3,080,634 | 3/1963 | Lindblad | 24/221 R |
| 3,126,089 | 3/1964 | Hugli | 411/517 X |
| 4,113,397 | 9/1978 | Snyder | 403/154 |

FOREIGN PATENT DOCUMENTS

| | | | |
|---|---|---|---|
| 947201 | 8/1956 | Fed. Rep. of Germany | 411/518 |
| 394841 | 12/1965 | Switzerland | 24/221 R |

*Primary Examiner*—Thomas J. Holko
*Attorney, Agent, or Firm*—Ernest H. Schmidt

[57] ABSTRACT

A pivotal rivet assembly for use in swingably securing a riveted member to a companion member, comprising a pivotal rivet member having a rivet shank portion for pre-riveting, and an integrally-formed, cylindrical head, an outer portion of which head is provided with a pair of diametrically-opposed lugs the under-surfaces of which lie in a common plane perpendicular with respect to the axis of symmetry of the rivet and in spaced, parallel relation with respect to the annular shoulder defined by the juncture of the rivet shank portion with the rivet head. The companion member to be swingably attached is provided with a through opening, the peripheral size and shape of which opening is complemental with the outer peripheral shape of the pivotal rivet head and its integral lugs to permit passage therethrough of said rivet head upon assembly or disassembly. The thickness of the companion member swingably joined is somewhat less than the length of the pivotal rivet head between the undersides of its opposed lugs and the annular shoulder to admit a resilient, split-ring retainer in circumjacent embracing disposition for constraining the riveted and companion members to relative swinging movement.

4 Claims, 7 Drawing Figures

PIVOTAL RIVET ASSEMBLY

BACKGROUND OF THE INVENTION

This invention relates to metal parts assembly rivets, and is directed particularly to a pivotal rivet assembly for metal work-pieces including a rivet member for riveting to one member of a pair of companion work-pieces to be assembled for relative swinging motion, and a split ring retainer member, the rivet portion comprising an outwardly-projecting, cylindrical head, the end of which is integrally formed with diametrically-opposed, outwardly-extending lugs, the companion member or work-piece to be swingably assembled having a through opening complemental in shape with the peripheral shape of the pivotal rivet head for its reception therethrough, and a resilient, split-ring retainer receivable in circumjacent relation about the rivet head and between the rivet head lugs and the outer surface of the companion-piece swingably assembled.

Rivets, nuts and bolts, and sheet-metal screws are commonly used in the assembly of metal parts. Ordinarily, if assembly is completed at the factory and subsequent disassembly during use is not anticipated, rivets will be used because of their low cost, ease of installation with power tools, effectiveness, and durability. For example, in the manufacture of the metal operating frame-work for folding beds, reclining chairs and the like, relatively swingable lever bars comprising movable portions of the frame-work are pivotally journaled with use of pivotal rivets, riveted at both ends at the factory. The parts being thus permanently inter-connected cannot be disassembled for compact storage or shipment prior to incorporation in the finished product. Since such frame-works are usually very bulky, the cost and space requirements for their storage and shipment prior to use are relatively large.

SUMMARY OF THE INVENTION

It is, accordingly, the principal of this invention to obviate the deficiencies of riveted pivotal interconnections of relatively swingable metal work-pieces in folding furniture frame-works and the like by combining, in a pivotal rivet structure adapted to be pre-riveted to one of a pair of the relatively swingable work-pieces, a cylindrical rivet head having an outer end portion integrally-formed with diametrically-opposed lugs, the companion work-piece being formed with an opening of such peripheral size and shape as to admit the head of the rivet and its lugs, to be retained in place by a resilient, split-ring retainer that can readily be manually applied and removed circumjacent the rivet head and between the undersides of the head lugs and the outer surface of the companion work-piece.

Yet another object of the invention is to provide a pivotal rivet assembly for securing together for relative swinging motion a pair of lever members or the like, and combining the structural and economic advantages of riveting with simplicity of assembly in the field for compact storage and efficient transportation while in disassembled condition prior to use.

Other objects, features and advantages of the invention will be apparent from the following description when read with reference to the accompanying drawings.

BRIEF DESCRIPTION OF THE DRAWINGS

In the drawings, wherein like reference numerals denote corresponding parts throughout several views.

DESCRIPTION OF THE PREFERRED EMBODIMENT

Figure 1:
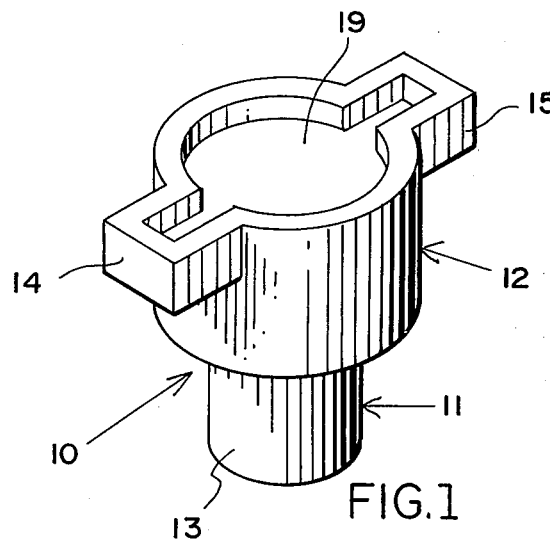
FIG. 1 is an oblique view, as seen from above, of a pivotal rivet embodying the invention.
Figure 2:
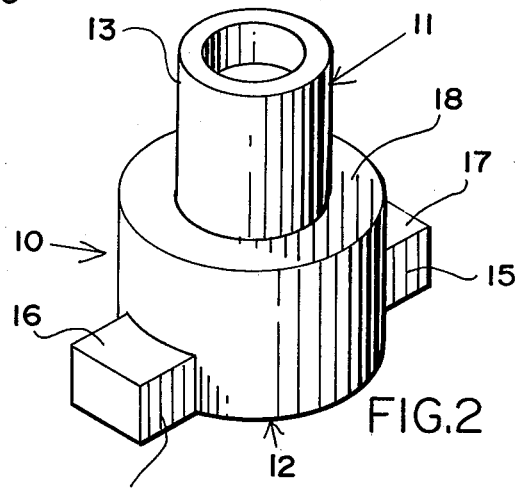
FIG. 2 is an oblique view as seen from the underside thereof.

Referring now in detail to the drawings, FIGS. 1 and 2 illustrate a preferred form of pivotal rivet embodying the invention, designated generally by reference numeral 10. The pivotal rivet 10 is integrally formed with a cylindrical shank 11 and a concentric, increased diameter, cylindrical head 12. The outer end portion 13 of the rivet head 12 is tubular, to be upset in riveting to a companion part or work-piece to be pivotally connected, as is hereinafter more particularly described. An outer end portion of the pivotal rivet head 12 is integrally-formed with a pair of diametrically-opposed, outwardly-projecting ears or lugs 14, 15 which will preferably be rectangular in transverse, cross-sectional shape. The inner surfaces 16, 17 of the lugs 14 and 15 lie in a common plane, said common plane being in spaced, parallel relation with respect to the plane defined by the annular surface 18 constituting the shoulder at the juncture of the rivet shank 11 with the rivet head 12. As is best illustrated in FIG. 1, the outer ends of the pivotal rivet head 12 and its associated lugs 14 and 15 are provided with a shallow recess 19 of conforming peripheral shape, for locating the anvil of a riveting tool during the riveting assembly of a pivotal rivet in the manner and for the purpose now to be described.

Figure 3:
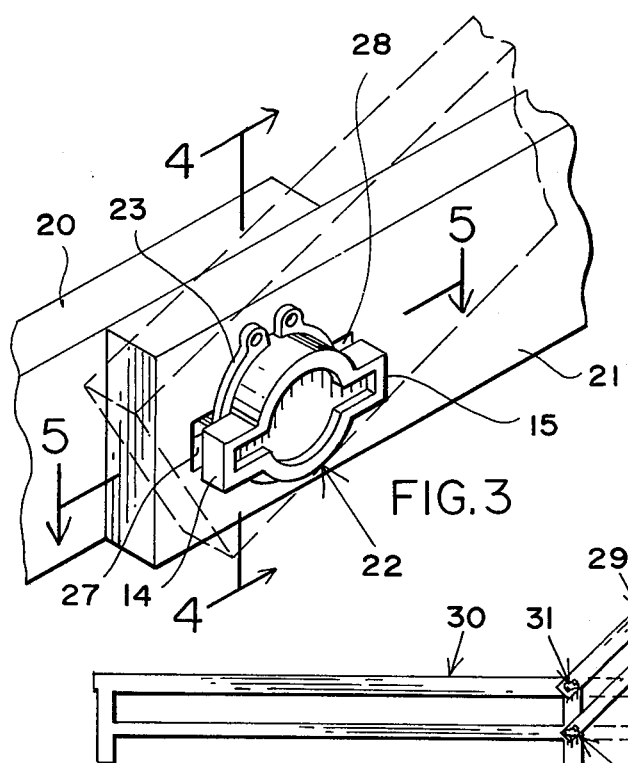
FIG. 3 illustrates, by way of example, use of the pivotal rivet in assembling a pair of relatively swingable parts of a folding mechanism.
Figure 4:
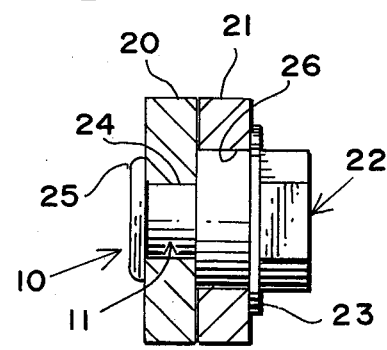
FIG. 4 is transverse cross-sectional view taken along line 4—4 of FIG. 3 in the direction of the arrows.
Figure 5:
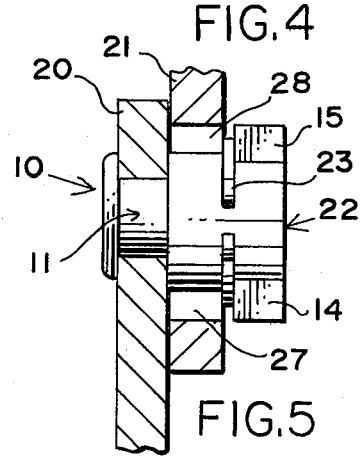
FIG. 5 is a transverse cross-sectional view taken along the line of 5—5 of FIG. 3 in the direction of the arrows.

As illustrated in FIG. 3, a pair of flat metal bars 20, 21 (partially illustrated) are shown with end portion disposed in face-to-face relation and pivotally inter-connected for relatively swinging motion by pivotal rivet assembly 22 comprising pivotal rivet 10 and split-ring retainer 23. As best illustrated in cross-sectional FIGS. 4 and 5, the pivotal rivet 10 is riveted at the factory to one of the parts to be pivotally assembled, part 20 for example, this part being provided with a through opening 24 for passage of the cylindrical shank 11 to be headed over at the outside, as indicated at 25. The pivotal rivet is thus permanently affixed to one of the relatively swingable parts. The other part (part 21 in the illustrated example) is provided with a through opening 26 conforming with and slightly larger than the peripheral shape of the rivet head 12 and its opposed lugs 14 and 15. Thus, part 21 is formed with a circular opening 26 of sufficient size to permit passage of the cylindrical portion of pivotal rivet 12, and opposed rectangular recesses 27 and 28 (see FIGS. 3 and 5) are of such size as to pass rivet head lugs 14 and 15. As illustrated in FIGS. 4 and 5, that portion of the length of the cylindrical head 12 of the pivotal rivet between the annular surface 18 and the undersides of head lugs 14 and 15 is slightly greater than the thickness of the part 21 to be pivotally attached, the difference being such as to admit the circumjacent reception of resilient split-ring retainer 23 therebetween. Thus, as illustrated in FIG. 3, the split-ring retainer 23 of the pivotal rivet assembly comprising said split-ring retainer and pivotal rivet 10 serves to prevent subsequent withdrawal of the rivet head portion through the opening in inter-connected part 21, constraining it to hinge-like swinging motion with respect to part 20.

Figure 6:
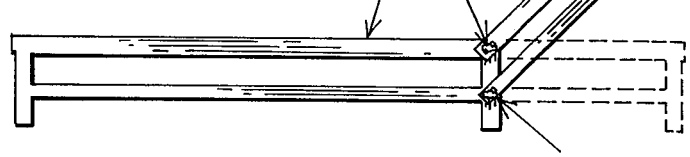
FIG. 6 illustrates, by way of example and in side elevation, the metal framework of a folding bed, showing use of pivotal rivet assemblies embodying the invention as the pivotal connection mechanism.
Figure 7:
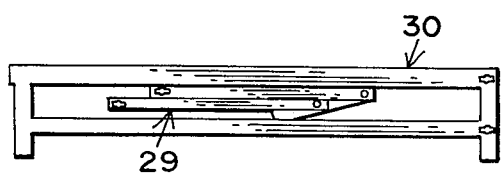
FIG. 7 is the side elevational view of the framework mechanism illustrating in FIG. 6, showing the folding head mechanism disassembled and compactly nested within the remainder of the framework for compact storage and shipment.

FIGS. 6 and 7 illustrate, by way of example, a folding bed framework in which a head portion 29 is pivotally connected with respect to a main framework portion 30 for elevating movement between horizontal position, as represented by the broken-line representation thereof, and an elevated position as illustrated by the full-line representation thereof in FIG. 6. The use of pivotal rivet assemblies indicated that 31 in FIG. 6 at the pivotal junctures joining head portion 29 and the remainder of the bed framework 30, enables quick release and reassembly simply by withdrawing and reassembling the associated split-ring retainers. As illustrated in FIG. 7, after removal or before assembly of the framework head portion 29, it can be compactly nested within the remainder of the framework, thereby substantially reducing overall size for economical transportation and storage.

While I have illustrated and described herein only one form in which my pivotal rivet assembly may conveniently be embodied in practice, it is to be understood that this embodiment is presented by way of example only and not in a limiting sense. My invention, in brief, comprises all the embodiments and modifications coming within the scope and spirit of the following claims.

What I claim as new and desire to secure by Letters Patent is:

1. A pivotal rivet assembly swingably securing a rivet member to a companion member comprising, in combination, a first flat metal bar, a second flat metal bar adapted to be pivotally interconnected in face-to-face relation with respect to said first flat metal bar for relative swinging motion and having a round opening and a pair of diametrically-opposed recesses communicating with said round opening, a rivet having a cylindrical rivet head, a reduced diameter rivet shank integrally formed with and extending coaxially outwardly of the underside said rivet head, the outer end of said shank being fixedly riveted to said first flat metal bar, the juncture of said rivet head with said rivet shank defining an annular shoulder lying in a plane perpendicular with the longitudinal axis of said rivet head and said shank, an outer end portion of said cylindrical rivet head being integrally formed with a pair of diametrically-opposed lugs the under-surfaces of which lie in a common plane parallel with said plane of said annular shoulder, the axial distance between said plane of said annular shoulder and said plane of said underside of said lugs being somewhat greater than the thickness of said second flat metal bar to be swingably secured, the peripheral size and shape of said opening and said opening recesses being complemental with the outer peripheral shape of said outer end portion of said rivet head with its said integral lugs to permit passage therethrough of said rivet head upon assembly or disassembly of said first and second flat metal bars, and a resilient arcuate member receivable in embracing relation about said rivet shank between the undersides of said rivet head lugs and outer surface portions of said second flat metal bar fitted over said rivet head.

2. A pivotal rivet assembly as defined in claim 1 wherein said diametrically-opposed lugs are rectangular in peripheral shape.

3. A pivotal rivet assembly as defined in claim 1 wherein said resilient arcuate member comprises a split-ring retainer.

4. A pivotal rivet assembly as defined in claim 3 wherein said diametrically-extending lugs are rectangular in peripheral shape.

* * * * *